United States Patent Office

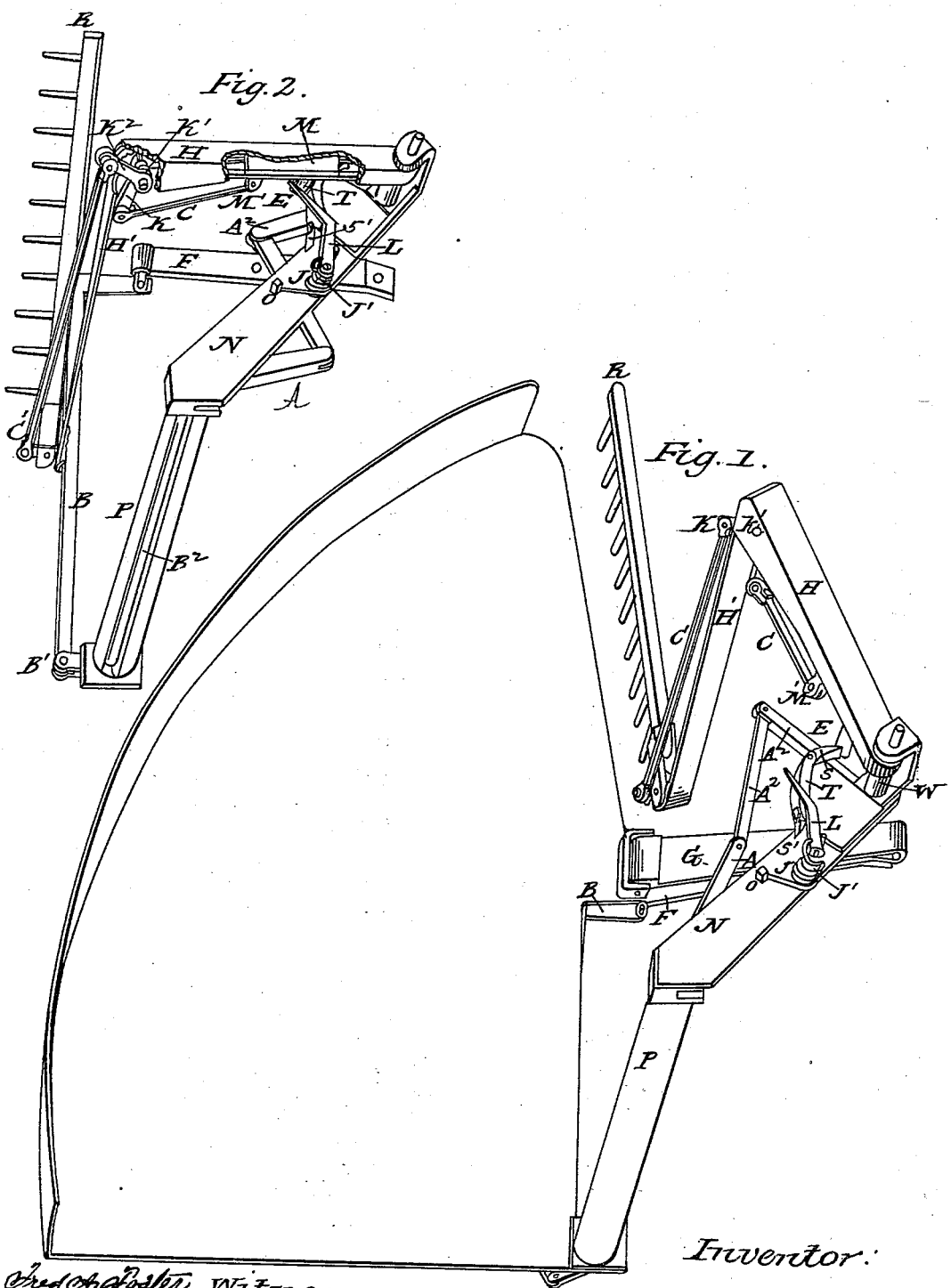

WILLIAM F. GOODWIN, OF WASHINGTON, DISTRICT OF COLUMBIA.

Letters Patent No. 64,521, dated May 7, 1867.

IMPROVEMENT IN HARVESTER-RAKES.

The Schedule referred to in these Letters Patent and making part of the same.

TO ALL WHOM IT MAY CONCERN:

Be it known that I, WILLIAM F. GOODWIN, of the city and county of Washington, and District of Columbia, have invented certain new and useful improvements in the Mechanism for Operating the Rake for Harvesters; and I do hereby declare the following to be a full, clear, and exact description of the construction and operation of the same, reference being had to the accompanying drawing, which is made part of this specification, and in which—

Figure 1 represents the platform of a harvester, having my improvement attached, showing a perspective view of the raking apparatus, when standing in front of the platform and looking down and to the rear of the machine, showing the position of the apparatus when the rake has finished its effective stroke, Figure 2 is a perspective view of the same apparatus detached from the machine, looking from the same position as in fig. 1, showing all the apparatus of the rake, which is attached to and vibrates with the platform; also showing the vibrating bar F, one end of which is attached to the machine, and by which motion is communicated to the apparatus on the platform.

Letters B $B^1$ and $B^2$, A $A^1$ and $A^2$, W and H, indicate the parts of the apparatus which impart to the rake its forward and backward motion. Letters T S $S^1$ E M $M^1$ C K and $C^1$ indicate the parts of the apparatus which serve to elevate and depress the rake.

Similar letters of reference indicate corresponding parts in the two figures.

This improvement relates to mechanism for operating harvester-rakes, which admits of being readily attached to different varieties of reaping machines, which is of simple construction, and believed to be practicable and efficient in operation.

To enable others skilled in the art to which my invention appertains to fully understand and use the same, I will proceed to describe it in connection with the accompanying drawings.

The platform represented in the drawings is of quadrant shape, the outside being made circular, the centre of the circle being situated between the driving-wheels of the machine, at a point nearly over the axle, and about two-fifths of the distance between the driving-wheels from the wheel next to the platform, which brings it near the centre of the frame when the platform is attached to the machine. The platform represented is adapted to a forward-cut machine, the cutter-bar being operated in front of the driving-wheels. By placing the fulcrum on which the rake swings between the driving-wheels, a circle is obtained sufficiently large to permit the rake to sweep over the platform from front to rear, thus sweeping the grain back past the driving-wheel and delivering it on the ground at the side of the platform in rear of the driving-wheels in gavels sufficiently large to form a sheaf. As this application has exclusive reference to the devices by which the rake is operated, I will limit the description to such devices and refer to parts of the reaping apparatus only by way of elucidation. F is a vibrating bar, which serves to connect the driving apparatus on the machine with the raking apparatus on the platform, being pivoted to the machine at one end, and attached to the bar B by a double-vibrating joint at the other. B is a bar extending from the front of the platform to the rear of the driving-wheel, having its forward end attached by a hinge-joint to the swinging end of the crank-arm $B^1$, and its after end attached to the bar F, serving as a connecting-bar between the bar F and crank-arm $B^1$, for the purpose of operating the upright shaft $B^2$, which stands upright in the hollow post P; having on its lower end the crank-arm $B^1$, and on its top end the crank-arm A. The swinging end of the crank-arm A is connected by a hinge-joint to the link $A^1$, which is attached to the swinging end of the crank-arm $A^2$ at its other end by hinge-joints, and serves as a connecting-link between the crank-arms $A^1$ and $A^2$. The crank-arm $A^2$ is fastened on the lower end of the short shaft W which stands upright, having its journals in the end of the projecting arm N, and carrying on its top end the swinging arm H. H is a bent arm, the horizontal part of which is made hollow to receive the sliding-bar M and rock-shaft $K^1$. $H^1$ is a part of the arm H, projecting downward toward the platform, bearing on its lower end the rake R. T is a track, in the form of the segment of a circle, the centre of which is the axis of the shaft W, and serves as a guide for the roller E which rolls round it. S is a switch, which opens out and allows the roller to pass out from behind it in its backward motion, and is thrown back into its place by a spring in front of the roller, causing the roller to pass round the outside of the track T in its forward motion, thereby operating the bar M and rod C, rock-shaft $K^1$, rod $C^1$, and thus elevating the rake. $S^1$ is a switch on the forward end of the track T, which serves to carry the roller forward till the projecting stud M¹ on the sliding-block M is locked on the stud O. When the roller has passed forward off the switch the switch is thrown back by a spring, and serves to prevent the roller from passing back on the outside of the track, forcing it to roll in to the inside of the track. L is a bent lever operated by the spring J¹ on the post J, and serves to force the roller E to the inside of the track T, thus depressing the rake. M is a sliding-block made to slide lengthwise in the arm H. E is a roller attached to the sliding-bar M, and serves to operate it. C is a connecting-rod, which serves to connect the sliding-block or bar M with the crank-arm K on the rock-shaft K¹. K² is a crank-arm fastened on the rock-shaft K¹ at right angles with the crank-arm K. C¹ is a connecting-rod which serves to connect the crank-arm K² with the stud or projection on the end of the rake-head R, and serves to elevate and depress the rake, which is attached to the end of the projecting arm H¹ by a hinge joint, on which it is operated by the rod C¹. P is a post standing on the front corner of the platform, made hollow to receive and support the shaft B². N is a projection fastened on the top of post P, projecting outward and backward toward the centre of the frame of the machine, serving as a support for the shaft W, which is the fulcrum on which the rake swings; also supporting all the apparatus connected with it.

Having thus described in detail the different parts of the apparatus and their uses, I will proceed to describe the operation of the same when the machine is in motion. When the machine moves forward, operating the bar F, the swinging end of the bar F operates on the bar B, which being attached to the swinging end of the crank-arm B¹, moves it forward, turning the shaft B² in the hollow post P, thereby causing the swinging end of the crank-arm A to move backward, which moves the link A¹ and the swinging end of the crank-arm A² backward, thereby turning the shaft W, and causing the swinging end of the arm H, which causes the rake to move backward and make its effective stroke, sweeping the grain from the platform. When the movement of the apparatus is reversed the swinging end of the arm H moves forward. The roller E passing round the outside of the track T causes the block M to slide toward the swinging end of the arm H, causing the rod C to operate on the crank-arm K, turning the rock-shaft K¹ which operates the crank-arm K², causing its swinging end to raise up, drawing the rod C¹ up with it. The rod C¹ drawing the swinging end of the stud to which it is attached, causes the rake to swing on its hinge on the end of the projecting arm H¹, thus elevating the rake, and holding it in an elevated position till it reaches the front of the platform. When the rake has reached the front of the platform, the roller having passed over the switch S¹, allowing the switch to spring back into its position, the stud M¹ is locked on the stud O, which serves to hold the rake in an elevated position till the motion of the apparatus is reversed and the rake starts to make its backward movement. When the roller rolls forward round the outside of the track, it forces the swinging end of the bent lever L out, the lever resting against the outside of the roller, the spring J¹ holding it firmly against the same. When the rake starts to make its effective stroke the stud M¹ unlocks itself from the stud O. The lever L pressing against the roller E forces it in to the inside of the track, thereby depressing the rake, and causing it to descend into the grain across the front of the platform. When the rake is making its effective stroke the roller E is bearing against the inside of the track, which serves to hold the rake down into the grain.

Having thus described my invention, what I claim as new, and desire to secure by Letters Patent, is—

1. The swinging bent arm H H¹, mounted on the projecting arm of post P, arranged and operating substantially in the manner and for the purpose described.

2. The sliding-bar M, rods C C¹, and crank-arms K K², or their equivalents, operating in connection with the swinging arm H and rake R, substantially as and for the purpose described.

3. The sliding-bar M, provided with roller E, arranged as described, and operated by the track T, substantially as and for the purpose described.

4. The track T, switches S S¹, and yielding lever L, arranged and operating substantially in the manner and for the purpose described.

5. The lever L, post J, spring J¹, and stud O, arranged and operating substantially as described.

WM. F. GOODWIN.

Witnesses:
    Addn. M. Smith,
    R. Leech.